(12) United States Patent
Seytter

(10) Patent No.: US 6,594,287 B1
(45) Date of Patent: Jul. 15, 2003

(54) APPARATUS AND METHOD FOR MULTIPLEXING DIGITAL DATA STREAMS TO FORM A COMPOSITE DATA STREAM

(75) Inventor: Fritz Seytter, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,982

(22) PCT Filed: Sep. 17, 1997

(86) PCT No.: PCT/DE97/02090

§ 371 (c)(1),
(2), (4) Date: May 10, 1999

(87) PCT Pub. No.: WO98/21846

PCT Pub. Date: May 22, 1998

(30) Foreign Application Priority Data

Nov. 8, 1996 (DE) .......................................... 196 46 244

(51) Int. Cl.$^7$ ................................................. H04J 3/00
(52) U.S. Cl. ....................................... 370/539; 370/541
(58) Field of Search ................................ 370/535, 536, 370/537, 538, 539, 541

(56) References Cited

U.S. PATENT DOCUMENTS

| | | | | |
|---|---|---|---|---|
| 4,364,081 A | * | 12/1982 | Hashimoto | 358/13 |
| 4,504,943 A | * | 3/1985 | Nagano et al. | 378/539 |
| 4,727,541 A | * | 2/1988 | Mori et al. | 370/535 |
| 4,768,186 A | * | 8/1988 | Bodell | 455/615 |
| 4,833,673 A | * | 5/1989 | Chao et al. | 370/537 |
| 5,123,015 A | * | 6/1992 | Brady et al. | 370/537 |
| 5,136,587 A | * | 8/1992 | Obana et al. | 370/535 |
| 6,151,336 A | * | 11/2000 | Cheng et al. | 370/535 |
| 6,202,178 B1 | * | 3/2001 | Spruyt | 714/702 |

FOREIGN PATENT DOCUMENTS

| | | |
|---|---|---|
| EP | 0 054 120 A1 | 10/1981 |
| EP | 0 634 840 A1 | 1/1995 |
| GB | 2 290 011 A | 11/1994 |
| JP | 8-274785 | 10/1996 |

OTHER PUBLICATIONS

Optical Engineering, "Status of H.324–the videoconferencing standard for the Public Switched Telephone Network and mobile radio", Richard A. Schaphorst, vol. 35, No. 1, Jan. 1996, pp. 109–112.

* cited by examiner

Primary Examiner—Ken Vanderpuye
(74) Attorney, Agent, or Firm—Bell, Boyd & Lloyd LLC

(57) ABSTRACT

Method and arrangement for multiplexing a multiplicity of digital data streams to form a digital overall data stream, as well as a method and arrangement for demultiplexing a digital overall data stream to form a multiplicity of digital data streams.

When multiplexing data streams (DS), the data streams are grouped to form digital intermediate data streams (ZDS). The grouping is carried out in such a manner that identical data streams (DS) are jointly grouped to form an intermediate data stream (ZDS) and different data streams (DS) are grouped into different intermediate data streams (ZDS). Measures for error identification and/or error correction of the intermediate data stream (ZDS) are carried out for the intermediate data streams (ZDS). Finally, the intermediate data streams (ZDS) are grouped to form the overall data stream (GDS).

17 Claims, 4 Drawing Sheets

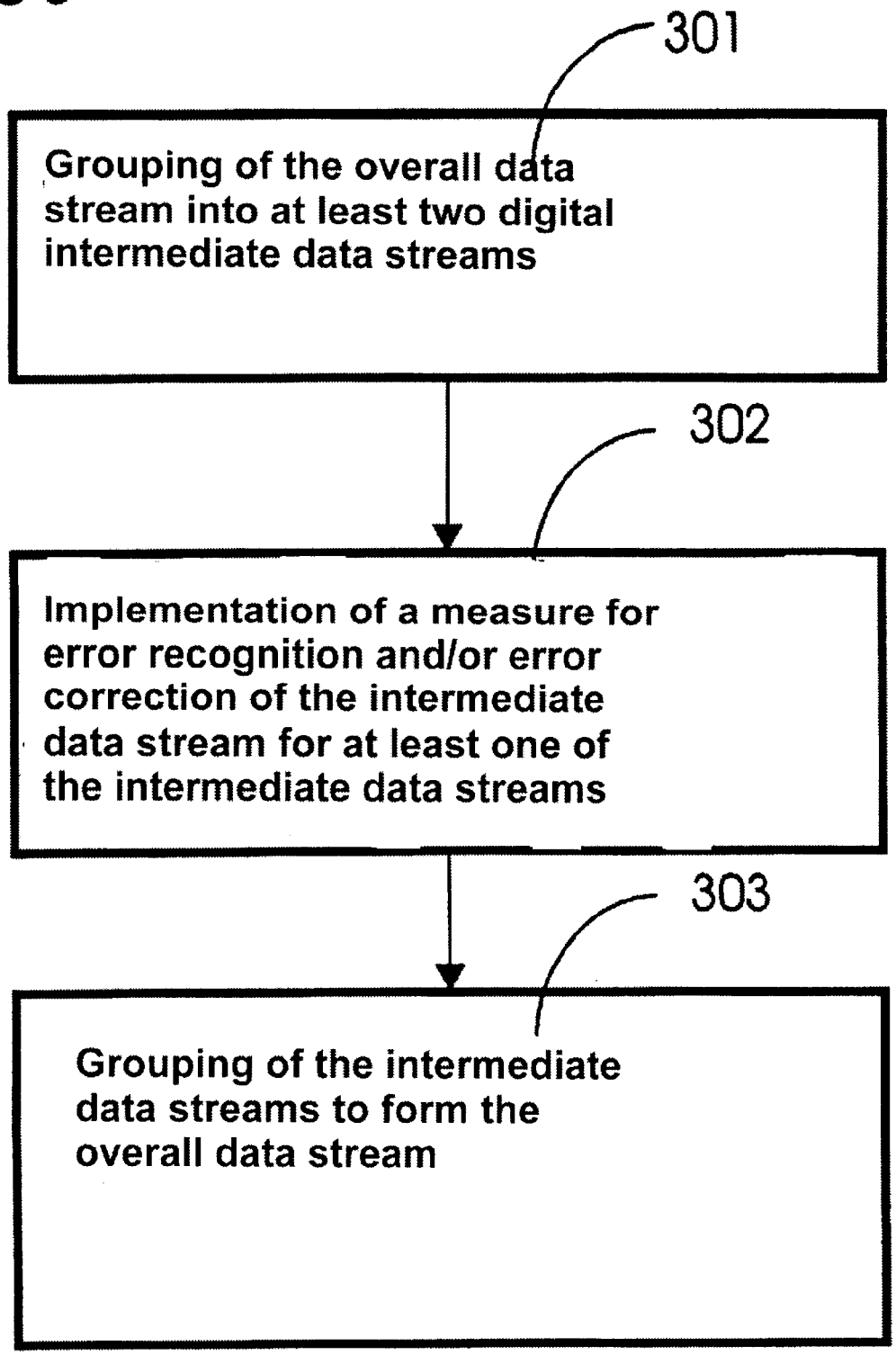

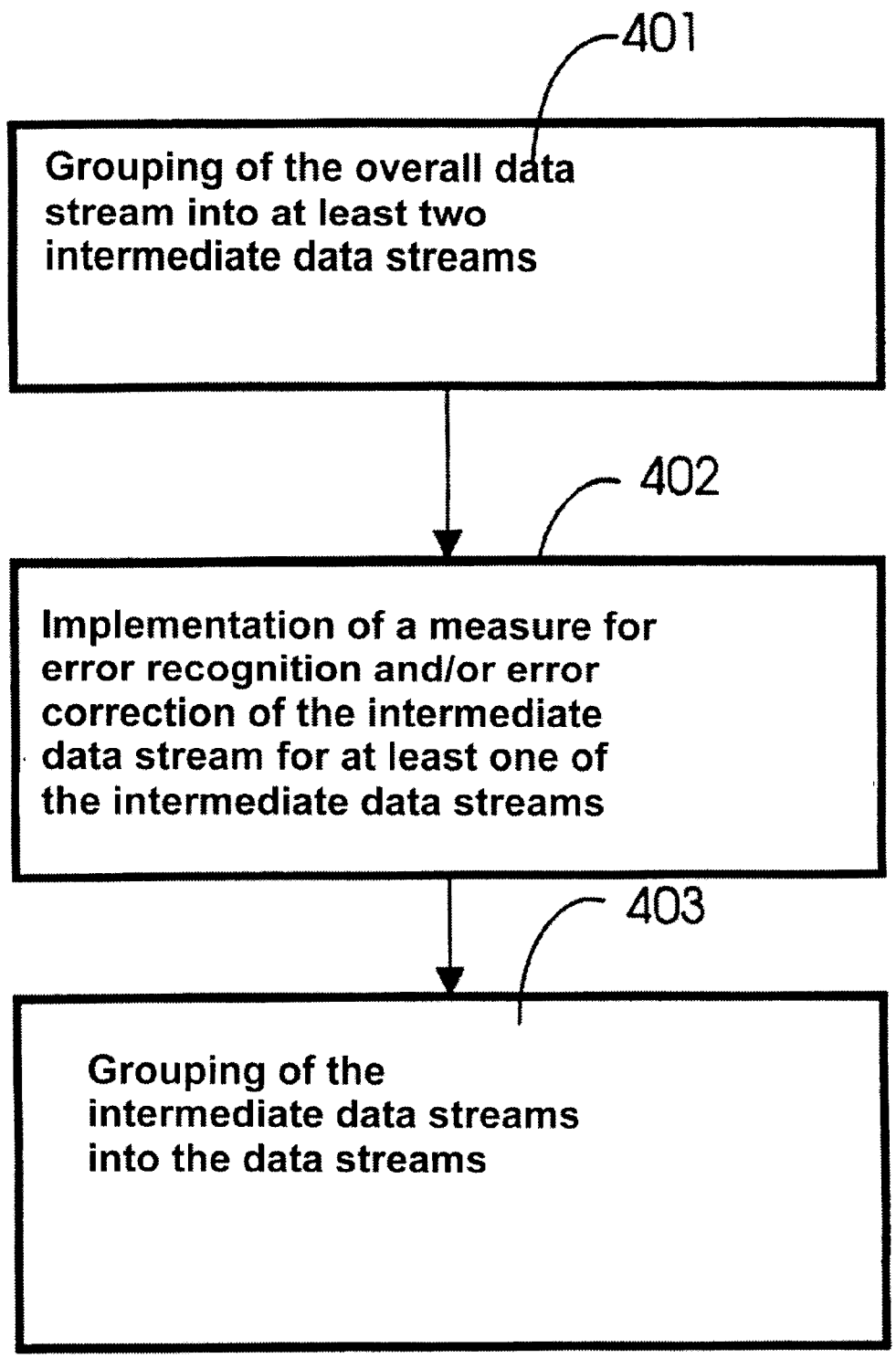

APPARATUS AND METHOD FOR MULTIPLEXING DIGITAL DATA STREAMS TO FORM A COMPOSITE DATA STREAM

BACKGROUND OF THE INVENTION

1. Field of the Invention

Method and arrangement for multiplexing a multiplicity of digital data streams to form a digital overall data stream, as well as a method and arrangement for demultiplexing a digital overall data stream to form a multiplicity of digital data streams.

2. Description of the Related Art

In the field of multimedia, a very wide range of types of digital data streams in some form have to be transmitted jointly. It is intended to make the influence of transmission errors which occur frequently during the transmission as imperceptible as possible for a user of a system which decodes the transmitted data and makes said data available to the user.

The term digital data streams in the following text is not intended in any way to mean, in the final analysis, digital data which can normally be processed into data packages of predeterminable size, that is to say with a predeterminable number of bytes.

Digital data with which text is described, for example a text file, audio data, video data, or digital control data for controlling any given technical system.

To this end, it is known from the document [1] for a measure to be provided for error identification and/or error correction for the data streams, and for the data streams to be multiplexed to form an overall data stream. It is in this case furthermore known from [1] for the measure for error identification and/or error correction to be carried out separately for each data stream which it is intended to transmit.

The term measure for error identification and/or error correction means, in the following text, a method by means of which it is possible to identify and/or to correct errors which occur in the transmission of a data stream.

A very wide range of principles of measures for error identification and/or error correction are known, for example so-called repetition requirement methods (Automatic Repeat Request methods, ARQ Type I, ARQ Type II) or else so-called methods for forward error correction. In the context of methods for forward error correction, a distinction is drawn between methods which identify errors and methods which correct errors.

The known procedure results primarily in the disadvantage of considerable inefficiency since a large element of header information is required, as well as information which is required for error identification and/or error correction. This problem increases severely as the number of data streams to be multiplexed and to be transmitted increases. The problem can even become so large that, beyond a certain number of data streams to be multiplexed, depending on the size of the data packages, no information whatsoever would be transmitted via the data streams, but only header information or information for error identification and/or error correction.

An arrangement is known from [4], in which a data stream is split into 3 data stream elements (wanted information, specific monitoring information, general monitoring information). The same error correction method is carried out for each of the 3 data stream elements.

[5] describes an image transmission unit in which a video data stream and an audio data stream are subjected separately to the same error correction method.

SUMMARY OF THE INVENTION

The invention is based on the problem of specifying methods and arrangements for multiplexing and demultiplexing data streams, by which means a more efficient measure for error identification and/or error correction is possible than was possible with the known method.

In accordance with one aspect of the invention, the data streams are grouped to form at least two digital intermediate data streams. The grouping is carried out in such a way that identical data streams (DS) are grouped jointly to form an intermediate data stream (ZDS) and different data streams (DS) are grouped into different intermediate data streams (ZDS). A measure for error identification and/or error correction of the intermediate data streams is carried out for the intermediate data streams, and the intermediate data streams are grouped to form the overall data stream.

In accordance with a further aspect of the present invention, the overall data stream is grouped to form at least two digital intermediate data streams. The grouping is carried out in such a manner that identical data streams (DS) are jointly grouped to form an intermediate data stream (ZDS) and different data streams (DS) are grouped into different intermediate data streams (ZDS). A measure for error identification and/or error correction of the intermediate data streams is carried out for at least one of the intermediate data streams, and the intermediate data streams are grouped into the data streams.

The arrangement for multiplexing a multiplicity of digital data streams to form an overall data stream has a first grouping stage with at least two first grouping units by means of which the data streams are grouped to form at least two digital intermediate data streams. The grouping is carried out in such a manner that identical data streams (DS) are jointly grouped to form an intermediate data stream (ZDS), and different data streams (DS) are grouped into different intermediate data streams (ZDS). A means for error identification and/or error correction of the intermediate data streams is in each case provided for at least one of the intermediate data streams. Furthermore, a second grouping stage is provided with a second grouping unit by means of which the intermediate data streams are grouped to form the overall data stream.

The arrangement for demultiplexing a digital overall data stream to form a multiplicity of digital data streams likewise has a second grouping stage with a second grouping unit, by means of which the overall data stream is grouped to form at least two digital intermediate data streams. The grouping is carried out in such a manner that identical data streams (DS) are jointly grouped to form an intermediate data stream (ZDS), and different data streams (DS) are grouped into different intermediate data streams (ZDS). Furthermore, a means for error identification and/or error correction of the intermediate data streams is provided for at least one of the intermediate data streams. A first grouping stage is also provided, having at least two first grouping units, by means of which the intermediate data streams are grouped to form the data streams.

Both the methods and the arrangements have the advantage that more efficient error identification and/or error correction is possible. As is explained in the following text, the level of efficiency of error identification and/or error correction also rises with a rising number of data streams for which error identification and/or error correction is intended to be carried out.

In a development, an advantageous feature of both the methods and the arrangements is that data streams which represent similar requirements in terms of a required error identification and/or error correction are grouped jointly into in each case one intermediate data stream.

In this way, a grouping is achieved which is matched to the respective requirement for error identification and/or error correction for a group of data streams, which allows very efficient error identification and/or error correction.

This advantage is furthermore reinforced by the fact that error identification and/or error correction matched to the respective requirements are/is provided for intermediate data streams, in a development.

In a development, it is furthermore advantageous to use an error-proof method in the second grouping stage and/or in the grouping of the intermediate data streams into the overall data stream and/or in the grouping of the overall data stream into the intermediate data streams. This development results in further protection of the transmission of the overall data stream, which leads to a further efficiency improvement in the methods and the arrangements.

In order to improve the reliability of the method, it is advantageous to carry out an initialization phase at the start of the method, the initialization phase being carried out using a data channel, which has good error protection and is provided by the multiplexer, for the transmission of the data via the transmission medium ÜM.

A further improvement is achieved in that data streams for which no error identification and/or error correction are/is required are not considered in the grouping into the intermediate data streams, and the latter are directly grouped with the intermediate data streams to form the overall data stream. This development leads to a saving in terms of methods for error identification and/or error correction for data streams for which no error identification and/or error correction are/is actually required. This leads on the one hand to a saving in computation time requirement for carrying out the method with a computer and, on the other hand, for example to a saving of multiplexers.

BRIEF DESCRIPTION OF THE DRAWINGS

The figures illustrate an exemplary embodiment of the invention, which will be explained in more detail in the following text, and in which figures.

FIG. 3 shows a flowchart in which the individual method steps for multiplexing the data streams to form an overall data stream are illustrated;

FIG. 4 shows a flowchart in which the individual method steps for demultiplexing the overall data stream into the data streams are illustrated.

DETAILED DESCRIPTION OF THE PREFERRED EMBODIMENTS

Figure 1:
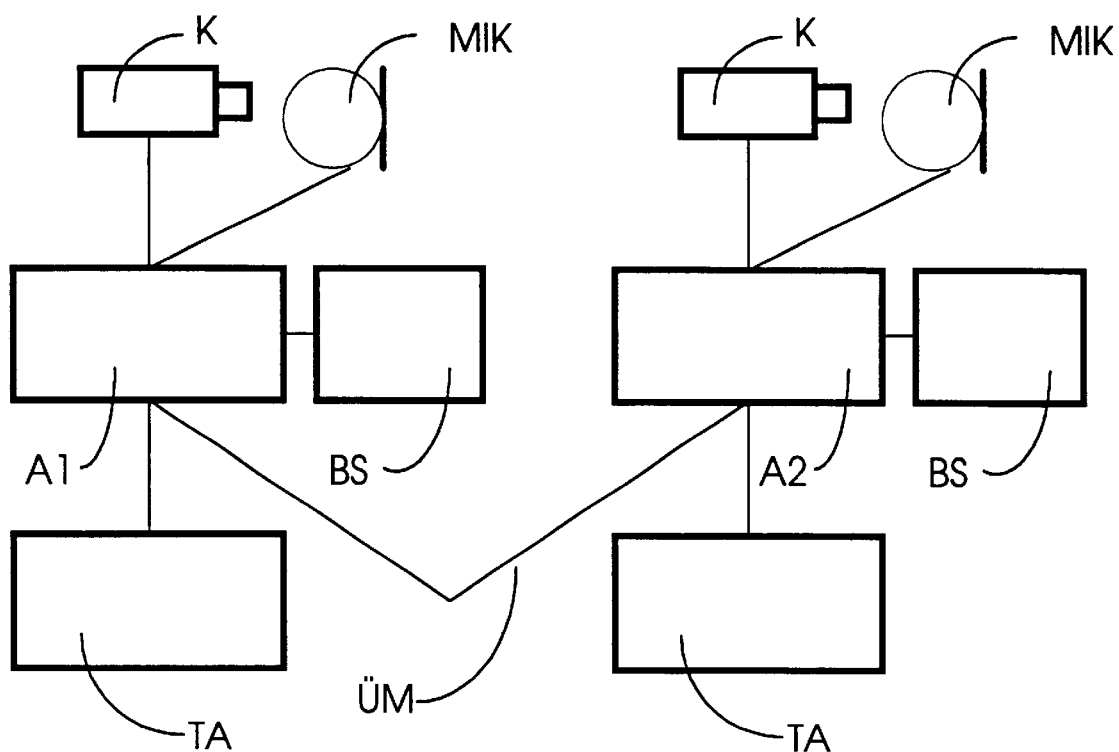
FIG. 1 shows a sketch with two arrangements, in which the transmission and processing of different data streams are described symbolically.

FIG. 1 illustrates a first arrangement A1 and a second arrangement A2. Furthermore, a camera K which is coupled to the respective arrangement A1, A2, a microphone MIK, a screen BS and a keyboard TA are illustrated symbolically for each arrangement A1, A2. The first arrangement A1 and the second arrangement A2 are coupled to one another via a suitable transmission medium ÜM for the transmission of data.

The camera K is used, for example, to record and digitize any required sequence of images, to supply them to the respective arrangement A1, A2, and to store them there.

The microphone MIK is used, for example, to record and digitize any required audio data, to supply them to the respective arrangement A1, A2 and to store them there.

Furthermore, digital data can, for example, also be entered into the respective arrangement A1, A2 by the user via the keyboard TA, manually, and can be stored there.

In a very wide range of application areas of digital communications technology, for example in the multimedia field, a very wide range of types of digital data have to be transmitted between communications partners, for example between the first arrangement A1 and the second arrangement A2. It is, of course, possible for the digital data to be transmitted between any required number of arrangements.

In the following text, digital data are called digital data streams DS.

In the following text, the term digital data stream DS must, in the final analysis, not be understood in any way to mean types of digital data which are normally processed in data packages of predeterminable size, that is to say with a predeterminable number of bytes (See FIG. 2):

digital data by means of which a text is described TD, for example a text file, audio data AD, video data VD, or digital control data (not illustrated) for controlling any required technical system.

Figure 2:
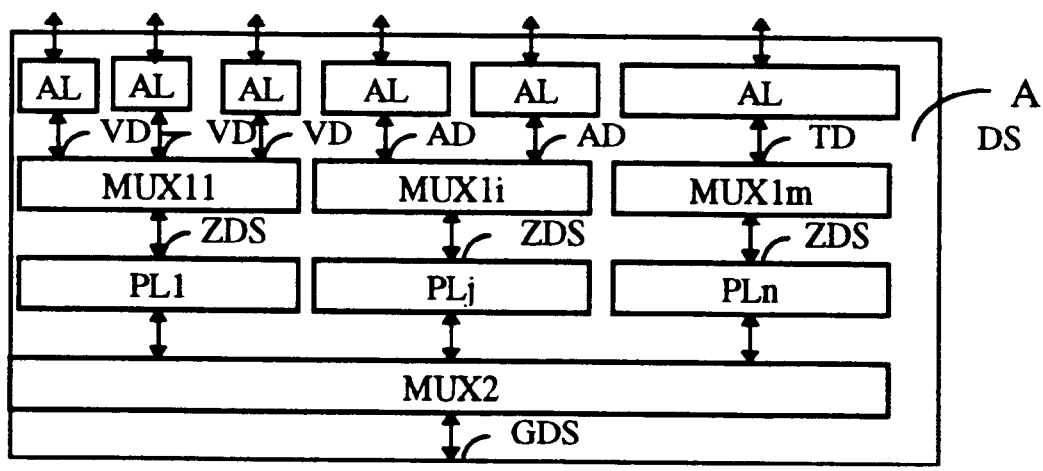
FIG. 2 shows a sketch in which an arrangement is sketched by means of which both multiplexing and demultiplexing of data streams are carried out.

FIG. 2 illustrates the design of an arrangement A for multiplexing and demultiplexing the data streams DS which are contained in the arrangements A1, A2 illustrated in FIG. 1. The arrangement A will be described in the following text in such a manner that it is designed as an arrangement A for multiplexing and demultiplexing depending on the direction of the data flow and thus depending on the "operating direction" of the arrangement A. This is illustrated symbolically by double arrows in FIG. 2.

So-called application levels AL are illustrated symbolically in FIG. 2.

One possible design of the application levels AL is described in [2]. The design of the application level AL described there is, however, not in any way essential for the invention. In the context of multiplexing, the application levels AL should be regarded only symbolically as means using which a data stream DS, normally in data packages of predeterminable size, is in each case supplied to a first grouping stage MUX1, which will be described in the following text. If the arrangement A is used for demultiplexing, the application levels AL should be regarded symbolically as means using which a data stream DS is in each case received and is further-processed in accordance with a predeterminable application, or is simply passed on to another application.

The situation frequently arises in which a multiplicity of identical and different data streams DS are to be transmitted.

The term identical data streams DS generally means data streams DS which present roughly the same requirements in terms of the need for transmission quality and, linked to this, in terms of the need for measures for error identification and/or error correction of the data streams DS.

For example, the requirements for transmission of video data streams VD are less stringent than for the transmission of text files TD.

The transmission of audio data streams AD is subject to very low-level requirements in terms of the transmission quality.

As the requirements for transmission quality of the data streams DS become more stringent for the same quality, that is to say for the same error rate, of a transmission medium ÜM used to transmit the data streams DS between the arrangements A1, A2, the requirements for the measures to be used for error identification and/or for error correction of the data streams DS also rise. The individual characteristics of the measures for error identification and/or error correction are known to the person skilled in the art.

The data streams DS provided by the application levels AL are supplied to the first grouping stage MUX1.

The first grouping stage MUX1 contains at least two first grouping units MUX1i, i=1 . . . m, using which the data streams DS are grouped to form at least two digital intermediate data streams ZDS.

The first grouping units MUX1i may be configured, for example in the arrangement for multiplexing data streams DS, as multiplexers MUX1i using which the data streams DS supplied to the respective multiplexer MUX1i are multiplexed to form the intermediate data stream ZDS. The multiplexers MUX1i may be of any required design. There is no need for any error protection in the multiplexers MUX1i in the first grouping stage MUX1.

In the case of the arrangement A for demultiplexing, the intermediate data stream ZDS supplied to the respective multiplexer MUX1i is split in the multiplexer MUX1i, into the corresponding data streams DS.

Furthermore, a means PLj, j=1 . . . n for error identification and/or error correction of the intermediate data streams ZDS is provided for at least one of the intermediate data streams ZDS. Each means PLj is coupled via an input EPLj to an output AMUX1i of a first grouping unit MUX1i.

Depending on whether the arrangement A is used for multiplexing or for demultiplexing, the means PLj is designed in such a manner that, depending on the measures used for error identification and/or error correction, generates the [lacuna] required for error identification and/or error correction for the intermediate data stream ZDS and is supplied to the intermediate data stream ZDS, or the corresponding information is evaluated. The specific design of the means PLj is governed by the measures desired for error identification and/or error correction for the respective intermediate data stream ZDS.

This results, above all, in the advantage that measures which are matched to the respective intermediate data stream ZDS can be provided for error identification and/or error correction, which leads to very efficient error identification and/or error correction.

A development of the arrangement A provides for a plurality of identical data streams DS to be supplied in each case to at least one grouping unit MUX1i. This leads to a situation in which, in this case, at least one intermediate data stream ZDS is formed, which contains identical data streams DS, for example only video data streams VD, only audio data streams AD or only text files TD. In general, the principle of grouping identical data streams DS to form an intermediate data stream ZDS can be used for any required number of types of data streams DS.

Together with a further refinement of the arrangement A, in which at least some of the means PLj are designed for error identification and/or error correction in such a manner that the error identification and/or the error correction are matched to the requirements for the respective intermediate data stream ZDS, the advantage of very efficient error identification and/or error correction is further considerably enhanced by the described development.

The outputs APLj of the means PLj are coupled to inputs EMUX2 of a second grouping stage MUX2. The second grouping stage MUX2 contains a second grouping unit, using which the intermediate data streams ZDS are grouped to form the overall data stream GDS.

The second grouping unit can likewise be configured as a multiplexer. It has been found to be advantageous to provide dedicated error protection for the data transmission of the second grouping unit. One possible implementation of such a multiplexer is described, for example, in [1].

The "operating direction" of the arrangement A on the other hand governs whether a plurality of intermediate data streams ZDS are grouped in the second grouping stage MUX2 to form the overall data stream GDS (for multiplexing the data streams DS), or whether the overall data stream GDS is grouped in the second grouping stage MUX2 to form the intermediate data streams ZDS (for demultiplexing the overall data stream GDS).

A refinement furthermore provides that no means PLj for error identification and/or error correction need be provided for data streams DS for which no error identification and/or error correction whatsoever are/is required. In this case, the output of the corresponding application levels AL is coupled directly to inputs EMUX2 of the second grouping stage MUX2.

FIGS. 3 and 4 show flowcharts which are used to describe the method steps of the method for multiplexing the data streams DS (see FIG. 3) and, respectively, for demultiplexing the overall data stream GDS (see FIG. 4).

The methods correspond to the steps for multiplexing and demultiplexing described in conjunction with the arrangement A.

In the case of the method for multiplexing the data streams DS, the data streams DS are grouped in a first step 301 to form at least two digital intermediate data streams ZDS, for example by multiplexing the data streams DS.

A measure for error identification and/or error correction of the intermediate data stream ZDS is carried out for at least one of the intermediate data streams ZDS, in a second step 302.

Measures for error identification and/or error correction have been explained above in conjunction with the description of the arrangement A.

Finally, the intermediate data streams ZDS are grouped in a third step 303 to form the overall data stream GDS which is now transmitted.

The method steps for demultiplexing the overall data stream are the inverse of the method steps described above for multiplexing the data streams DS.

This means that the overall data stream GDS is grouped in a first step 401 to form at least two intermediate data streams ZDS.

A measure for error identification and/or error correction of the intermediate data stream ZDS is carried out for at least one of the intermediate data streams ZDS, in a second step 402.

The intermediate data streams ZDS are grouped in a third step 403 into the data streams DS which are made available, for example to any required application.

Developments described in the following text are envisaged both for the method for multiplexing and for the method for demultiplexing.

As described above and corresponding to a refinement of the arrangement A it is provided, that for the case when at least two data streams DS are subject to different requirements in terms of the required measures for error identification and/or error correction, data streams DS which are subject to similar requirements must be grouped to form a common intermediate data stream ZDS.

It is furthermore provided in a development for measures which are matched to the requirements for at least some of the intermediate data streams ZDS to be used for error identification and/or error correction for the respective intermediate data stream ZDS.

As described above, it has been found to be advantageous to use an error-proof method for the grouping of the intermediate data streams ZDS into the overall data stream GDS and for the grouping of the overall data stream GDS into the intermediate data streams ZDS.

An error-free method in this context is, for example, the ITU-H.223/Annex Method A, which is described in [1].

Furthermore, a refinement of the method provides for an initialization phase to be carried out at the start of the method, which initialization phase takes place via an error-proof transmission medium ÜM. The term error-free transmission medium ÜM in this case means a transmission medium ÜM which ensures that no errors can occur during the data transmission. In this way, reliable initiation of the further method steps can take place.

It has furthermore been found to be advantageous not to take account of data streams DS for which no error identification and/or error correction is required, with regard to the grouping into the intermediate data streams ZDS. This type of data stream DS, for example when the requirements for the audio quality of audio data streams AD are not stringent, is grouped directly using the intermediate data streams ZDS to form the overall data stream GDS.

Finally, it should be mentioned, that the individual grouping units MUX1i, MUX2 and the multiplexers MUX1i, MUX2 can either be implemented in hardware, or their functions can be implemented in software.

The following publications have been cited in the course of this document:

[1] ITU-T Draft Recommendation H.223/Annex A, International Telecommunication Union, Telecommunication Standardization Sector, August 1996

[2] ITU-T Draft Recommendation H.223 International Telecommunication Union, Telecommunication Standardization Sector, August 1996
available on the Internet on Jun. 11, 1996 at the following FTP address:
ftp://ftp.std.com/vendors/PictureTel/h223

[3] ITU-T Draft Recommendation H.324 International Telecommunication Union, Telecommunication Standardization Sector, pages 6–9, November 1995
available on the Internet on Jun. 11, 1996 at the following FTP address:
ftp://ftp.std.com/vendors/PictureTel/h324

[4] GB 2 290 011 A

[5] JP 8-274 785 A2

What is claimed is:

1. A method for multiplexing plurality of digital data streams to form a composite data stream comprising:
   combining data streams to form at least two digital intermediate data streams;
   wherein identical data streams are jointly grouped to form an intermediate data stream and different data streams are grouped into separate intermediate data streams;
   whereby at least one intermediate data stream is formed of at least two data streams, providing error identification and/or error correction of the intermediate data stream for at least one intermediate data stream;
   grouping the intermediate data streams to form the composite data stream; and
   wherein at least two data streams have a different requirement for error identification and/or error correction, and in which data streams having a similar requirement are grouped to form a joint intermediate data stream.

2. A method for demultiplexing a digital composite data stream to form a plurality of digital data streams, wherein the composite data stream is comprised of at least two digital intermediate data streams, comprising:
   separating the composite data stream into identical data streams from an intermediate data stream and separating different data streams from different intermediate data streams;
   applying a step of error identification and/or error correction of the intermediate data stream; and
   wherein at least two data streams have a different requirement for error identification and/or error correction, and in which data streams having a similar requirement are grouped to form a joint intermediate data stream.

3. A method according to claim 1, in which at least some of the groupings are produced by multiplexing or demultiplexing data.

4. A method according to claim 2, further comprising:
   executing error identification and/or error correction configured for the different requirement for error identification and/or error correction.

5. A method according to one of claim 1, wherein a method reliable with respect to the occurrence of errors is used for the grouping of the intermediate data streams into the composite data stream a method reliable with respect to the occurrence of errors.

6. A method according to claim 5, in which a method according to ITU-H.223/Annex Method A is used for the grouping of the intermediate data streams into the composite data stream.

7. A method according to claim 2, wherein a method reliable with respect to the occurrence of errors is used in the grouping of the overall data stream into the intermediate data streams.

8. A method according to claim 7, whereby a method according to the ITU-H.223/Annex A method is employed for he grouping of the overall data stream into the intermediate data stream.

9. A device for multiplexing a plurality of digital data streams to form a composite data stream comprising:
   combining data streams to form at least two digital intermediate data streams;
   wherein identical data streams are jointly grouped to form an intermediate data stream and different data streams are grouped into separate intermediate data streams;
   whereby at least one intermediate data stream is formed of at least two data streams, providing error identification and/or error correction of the intermediate data stream for at least one intermediate data stream;
   grouping the intermediate data streams to form the composite data stream;
   wherein data streams for which no error identification and/or error correction is required are not considered in the step of grouping into the intermediate data streams, and in which these data streams are grouped directly with the intermediate data streams to form the composite data stream.

10. A device for multiplexing a plurality of digital data streams to form a composite data stream comprising:

a first grouping stage having at least two different grouping units by means of which data streams are grouped to form at least two digital intermediate data streams, the grouping being carried out such that identical data streams are jointly grouped to form an intermediate data stream, and different data streams are grouped into different intermediate data streams;

whereby at least one intermediate data stream is formed of at least two data streams;

a means for providing error identification and/or error correction of the intermediate data streams for at least one of the intermediate data streams;

wherein the means for providing error identification and/or error correction are coupled to the first grouping units, and a second grouping stage having a second grouping unit by means of which the intermediate data streams are grouped to form the composite data stream.

11. A device for demultiplexing a digital composite data stream to form a plurality of digital data streams comprising:

a second grouping stage having a second grouping unit by means of which the overall data stream is grouped to form at least two digital intermediate data streams, the grouping being carried out in such a manner that identical data streams contained in the overall data stream are jointly grouped to form an intermediate data stream, and different data streams are grouped into different intermediate data streams;

whereby at least one intermediate data stream is formed of at least two data streams;

a means for providing error identification and/or error correction of the intermediate data streams for at least one of the intermediate data streams, a first grouping stage having at least two first grouping units by means of which at least two of the intermediate data streams are grouped to form the data streams, and in which the first grouping units are coupled to the means for providing error identification and/or error correction.

12. A device according to claim 10, in which a multiplexer stage having a plurality of multiplexers which form at least some of the grouping stages.

13. A device according to claim 10, in which at least two data streams represent a different predetermined requirement with respect to a measure for error identification and/or error correction, and a means for error identification and/or error correction of data streams for a similar requirement.

14. A device according to claim 13, in which at least one of the means for error identification and/or error correction are configured for a requirement.

15. A device according to claim 10, in which the second grouping unit performs a method reliable with respect to the occurrence of errors is carried out.

16. A device according to claim 15, in which the second grouping unit is designed in such a manner that a method according to ITU-H.223/Annex A is carried out.

17. A device according to claim 10, in which no means for error identification and/or error correction is provided for data streams for which no error identification and/or error correction is required.

* * * * *